(12) United States Patent
Stille

(10) Patent No.: US 8,730,942 B2
(45) Date of Patent: May 20, 2014

(54) METHOD AND ARRANGEMENT FOR ENABLING A MULTIMEDIA COMMUNICATION SESSION

(75) Inventor: Mats Stille, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2106 days.

(21) Appl. No.: 11/667,752

(22) PCT Filed: Nov. 15, 2004

(86) PCT No.: PCT/SE2004/001671
§ 371 (c)(1),
(2), (4) Date: Jan. 23, 2008

(87) PCT Pub. No.: WO2006/052176
PCT Pub. Date: May 18, 2006

(65) Prior Publication Data
US 2009/0010247 A1    Jan. 8, 2009

(51) Int. Cl.
*H04L 12/66* (2006.01)
*H04W 4/00* (2009.01)
*H04W 36/00* (2009.01)

(52) U.S. Cl.
USPC ............ 370/352; 370/329; 370/331; 455/436

(58) Field of Classification Search
USPC ................... 370/352, 349, 331, 329; 455/436
See application file for complete search history.

(56) References Cited

U.S. PATENT DOCUMENTS

| | | | |
|---|---|---|---|
| 2002/0168969 A1* | 11/2002 | Koskinen et al. | 455/424 |
| 2004/0076145 A1* | 4/2004 | Kauhanen et al. | 370/352 |
| 2004/0153547 A1 | 8/2004 | Trossen | |
| 2004/0184439 A1 | 9/2004 | Blanc et al. | |
| 2004/0252674 A1 | 12/2004 | Soininen et al. | |
| 2005/0124341 A1* | 6/2005 | Myllymaki et al. | 455/435.1 |

FOREIGN PATENT DOCUMENTS

| | | |
|---|---|---|
| WO | 01/76165 | 10/2001 |
| WO | 03/003767 A1 | 1/2003 |
| WO | 2004/084055 A1 | 9/2004 |

OTHER PUBLICATIONS

International Search Report mailed Jun. 2, 2005.
International Preliminary Report on Patentability.
Taiwan Office Action dated Nov. 21, 2011 (5 pages).

* cited by examiner

*Primary Examiner* — Asad Nawaz
*Assistant Examiner* — Stephanie Chang
(74) *Attorney, Agent, or Firm* — Nixon & Vanderhye, P.C.

(57) ABSTRACT

A method and arrangement for enabling multimedia during an ongoing circuit-switched call between a first mobile terminal and a second terminal, wherein the first terminal uses a first access having constraints by not admitting simultaneous packet-switched and circuit-switched communication. A change of connection is detected from the first access to a second access having no such constraints by admitting simultaneous packet-switched and circuit-switched communication. A capability query is then sent to the second terminal in response to said detection. When the requested capabilities are received from the second terminal, possible multimedia applications and/or services are indicated to the user according to the received capabilities.

15 Claims, 3 Drawing Sheets

METHOD AND ARRANGEMENT FOR ENABLING A MULTIMEDIA COMMUNICATION SESSION

This application is the U.S. national phase of International Application No. PCT/SE2004/001671 filed 15 Nov. 2004, the entire contents of which are hereby incorporated by reference.

TECHNICAL FIELD

One or more aspects of the present invention relate generally to a method and apparatus for enabling a multimedia communication session comprising a circuit-switched part and a packet-switched part. In particular, one or more aspects of the invention enable transfer of packet-switched data, such as video, images, text, etc, in addition to an ongoing circuit-switched voice call.

BACKGROUND OF THE INVENTION AND PRIOR ART

Fixed and mobile communication terminals have so far been used mainly for making voice calls. Standardised and well-working communication technologies and protocols are then utilised to communicate voice between fixed and/or mobile terminals using circuit-switched communication channels. In particular, radio based circuit-switched channels for mobile terminals have been designed and optimised to provide acceptable quality and reliability for voice calls.

A multitude of new telephony services involving "multimedia" are now rapidly being developed, which are made possible by the introduction of new technologies allowing notably higher transmission rates and increased network capacity. For example, GPRS (General Packet Radio Service) and WCDMA (Wideband Code Division Multiple Access) technologies are currently emerging for enabling wireless telephony services requiring a wide range of transmission rates and different protocols. The trend today is also a move towards packet-switched networks and technologies providing more capacity and flexibility as compared to the traditional circuit-switched networks. Further, new sophisticated mobile terminals are also emerging on the market, equipped with functionality to handle the new services, including high resolution colour displays and various codecs (coders/decoders) for visual information.

Multimedia services sometimes require real-time transmission of video information as well as audio information, and may further involve the transmission of added data representing text, documents, images, audio files and video files in various formats and combinations. The term "multimedia" will be used in this description to represent any telephony services requiring the transfer of any data, in addition to ordinary voice. A multimedia session typically involves voice and other media at the same time.

A prevailing goal or ambition in the field of telecommunication is to converge all services on to a single transport mechanism—the packet based Internet Protocol (IP), regardless of the type of access networks and technologies. Recently, a network architecture called "IP Multimedia Subsystem" (IMS) has been developed by the $3^{rd}$ Generation Partnership Project (3GPP) as an open standard, to give operators of access networks the ability to offer multimedia services in the packet domain. IMS is a platform for enabling services based on IP transport, more or less independent of the access technology used, and is basically not restricted to any limited set of specific services.

However, packet based IP transport technology is currently not quite suitable for voice communication, mainly due to shortcomings in quality and reliability. Briefly described, the main difference is that a circuit switched channel is a permanent connection for the duration of a call with a fixed and guaranteed bandwidth, resulting in fairly consistent quality and reliability, whereas in packet switching a connection of variable bandwidth is temporarily established whenever there is any information to transmit in a packet format. Packet switching is therefore inherently associated with various unpredictable transmission delays and packet losses that may potentially result in unacceptable variations of quality, bitrate and reliability. In particular, a radio link is typically the critical part of a transmission path due to its limited bandwidth and sensitivity to interference. Transmission delays can therefore be a significant problem when packet-switched radio channels are used.

As a result, a traditional circuit switched (duplex) voice bearer is currently considered to be better than a packet switched (non-duplex) voice bearer in this respect. Hence, network operators are not yet able to launch all-IP multimedia services involving voice transport with full duplex, in 3G mobile networks.

To overcome these problems, it has been proposed that a multimedia communication session should be divided into a circuit-switched part for the voice transport using a circuit-switched telephony system, and a packet-switched part for the transport of other data using a packet-switched telephony system based on IP technology. According to this proposal, circuit-switched bearers are used for voice transport, particularly in radio links, whereas completely separate packet-switched bearers are used for the transport of other media. In this way, the high performance associated with the traditional full duplex channels is obtained for voice, whereas any other data involved in multimedia services can be adequately supported by packet-switched transport, since it is normally not equally delay-sensitive. This arrangement can also reduce the costs for network operators by utilising existing resources for circuit-switched transmission, as e.g. in GPRS networks having both capabilities.

This solution is schematically illustrated in FIG. 1 where two mobile terminals A and B are engaged in a multimedia session involving both voice and data. Terminal A is connected to access network 100A and terminal B is connected to access network 100B, providing radio access over respective radio channels. Here, it is assumed that each access network has separate architectures and logic systems for circuit-switched and packet-switched transports, schematically indicated as a "CS path" and a "PS path", respectively, within each network 100A, 100B.

In this arrangement, the communication path through the various networks and nodes involved in the session between the terminals A and B is divided into a circuit-switched (CS) part and a packet-switched (PS) part, which will be called the "CS part" and the "PS part" for short hereafter. Voice is thus transported over a separate circuit-switched logic system which may involve various other networks and paths, not shown, as schematically represented by the block "CS logic" 102. Any other data involved with the used multimedia service, such as video, images, text, etc., is transported over a separate packet-switched logic system, as represented by the block "PS logic" 104. In this schematic model, the CS logic 102 includes the CS paths of networks 100A, 100B and the PS logic 104 includes the PS paths of networks 100A, 100B. Such sessions with simultaneous CS and PS parts will become possible for access based on, e.g., WCDMA or GSM with DTM (Dual Transfer Mode) capability. However, many existing access networks are not capable of such dual mode communication and for some time in the future, there will be both types of networks in operation.

When using multimedia services, the prerequisites for each specific session will vary depending on the invoked service and the capabilities of the calling and called terminals, respectively, as well as on other factors. During a session, certain so-called session parameters defining the rules of communication must be used by both the calling and called terminals in order to communicate the desired information. Such session parameters may be related to available codecs, applications and multiplexing schemes.

Since many different types of terminals are available on the consumer market, two terminals about to communicate multimedia will most likely have different capabilities and each terminal has initially no knowledge of the capabilities of the other. In order to establish a multimedia session, session parameters must therefore first be selected and determined in a session setup procedure, which is a kind of negotiation typically performed by the two terminals only, without involving any intermediate network node.

Thus, the terminals must exchange information regarding their specific capabilities and preferences, in order to agree on which session parameters to use during a forthcoming multimedia session. A specification for session setup has been defined called "SIP" (Session Initiation Protocol, according to the standard IETF RFC 3261 et al). SIP is an application-layer control (signalling) protocol for creating, modifying and terminating sessions over a packet-switched logic. In SIP, a method called "INVITE" is defined to initiate a session during a call setup when the terminals exchange their capabilities.

Another method called "OPTIONS" is also specified in the SIP protocol allowing one terminal to query another terminal as to its capabilities regarding codecs and supported applications, without the user actually "calling" the other party. According to this method, the terminal sends a message called "SIP OPTIONS" to the other terminal, which then responds by sending over its capabilities to the first terminal. The first terminal can then indicate the optional multimedia to its user, e.g. by displaying available services and/or applications as icons or the like on the screen. In this way, the user can decide which type of service and media to use in a forthcoming call with the other party. After responding to a SIP OPTIONS message, a terminal may likewise automatically send a SIP OPTIONS message to the first terminal. Alternatively, it has been proposed that a terminal shall include its own capabilities when sending a SIP OPTIONS message, in order to save round-trips in this dialogue.

However, in order to exchange a SIP OPTIONS message, a "PDP context" must have been established first for the terminal, since the SIP OPTIONS message can only be sent across a PDP context. Establishing a PDP context for a mobile terminal includes allocating a temporary IP address to the terminal in order to be able to communicate data packets with the terminal in the future, wherever it is located. Basically, the PDP context can be established at any time, e.g. when the terminal is powered on.

The OPTIONS method is currently supported by PC (Personal Computer) terminals only, but is expected to be introduced for mobile terminals as well. The OPTIONS method can even be used during an ongoing voice call for enriching the call with packet-based media such as real-time video or the exchange of images, provided that both access networks allow for the establishment of a PS part in addition to the currently used CS part.

Given the technical background above, a problem that can be anticipated is that when two terminals are engaged in a simple voice call, one of them (or both) may currently experience constraints of access, such that a packet-switched communication is not admitted in addition to the ongoing circuit-switched voice call depending on limitations in the access network, hereafter "access constraints". Therefore, a PDP context may not be established for that terminal. For example, a standard GSM network cannot handle PS connections and CS connections at the same time, although it may admit a PS connection separately. In that case, a PDP context can be established for the PS connection.

For example, if one terminal A is currently under access constraints not admitting simultaneous CS and PS communication, such as when connected to a standard GSM network without DTM capability, it is not possible to introduce multimedia to the call by establishing a PS part in addition to the voice call. This is a fact even if the other terminal B becomes connected to an access network allowing simultaneous CS and PS communication, such as a WCDMA network or a GSM network having DTM capability. Further, if a terminal user tries to make a capability query during a voice call in the constrained network as described above, the SIP OPTIONS message cannot be communicated, due to lack of a PDP context for one of the terminals, or both. Hence, a terminal under constrained access can neither send nor receive a SIP OPTIONS message.

Furthermore, there are known mechanisms for a terminal to change its radio access during an ongoing call, e.g. by moving from one coverage area into another one, which potentially may change the prerequisites for multimedia. For example, some terminals are capable of both GSM access and WCDMA access by having dual radio parts. Thus, two terminals A and B may initially be prevented from establishing a multimedia session, due to access constraints for at least one terminal A having dual access capability. Therefore, only a circuit-switched voice call can be executed initially, even if terminal A later, during the ongoing call, obtains a new access allowing for an added PS part, e.g. by changing from a standard GSM access to a WCDMA access. In some networks, it is possible to obtain a new access without said access constraints by making handover from one cell to another within the same network.

Consequently, terminal users may be prevented from enriching a voice call by introducing multimedia, even if their access would allow for it at some point after establishment of a circuit-switched voice call. As a result, the terminal users will miss the opportunity of using multimedia even when technically possible, and the network operator(s) will miss out on potential revenue therefrom.

SUMMARY OF THE INVENTION

It is an object of the present invention to provide a solution for enabling a multimedia communication session involving at least one mobile terminal. It is another object of the present invention to enable a session comprising a packet-switched part and a circuit-switched part, such that the terminal user is notified in response to gaining access allowing such a session.

These objects and others are obtained by providing a method and arrangement for enabling multimedia during an ongoing circuit-switched call between a first mobile terminal and a second terminal, wherein the first terminal uses a first access having constraints by not admitting simultaneous packet-switched and circuit-switched communication. A change of connection is detected from the first access to a second access having no such constraints by admitting simultaneous packet-switched and circuit-switched communication. Then, a capability query is sent to the second terminal in response to said detecting step and capabilities are received from the second terminal. Thereafter, possible multimedia applications and/or services are indicated to the user according to the received capabilities.

The first access may involve connection with a first access network having said access constraints, and the second access may involve connection to a second access network lacking said access constraints. The packet-switched communication may include at least one media stream with data for video, text, game and/or images, and the circuit-switched call is typically a voice call.

A PDP context may be established for the first terminal after the change of connection, but before sending the capability query, unless it has already been established.

The possible multimedia applications and/or services may be indicated to the user by displaying corresponding icons or the like on the screen, or by generating an audio message such as a voice prompt.

In order to save the amount of messages exchanged between the terminals, the capabilities of the first terminal are preferably included in the capability query to the second terminal.

According to another aspect of the present invention, a mobile terminal is adapted for enabling multimedia during an ongoing circuit-switched call with another terminal, when a first access is used having constraints by not admitting simultaneous packet-switched and circuit-switched communication. The terminal comprises means for detecting a change of connection from the first access to a second access having no such constraints by admitting simultaneous packet-switched and circuit-switched communication. The terminal further comprises means for sending a capability query to the other terminal in response to detecting said change of connection, means for receiving capabilities from the other terminal, and means for indicating possible multimedia applications and/or services to the user according to the received capabilities.

The detecting means may be adapted to detect a change of connection from a first access network having said access constraints to a second access network lacking said access constraints. The terminal also may be adapted to establish a PDP context after said change of connection, but before sending a capability query.

The indicating means may be adapted to indicate the possible multimedia applications and/or services by displaying corresponding icons or the like on the screen, or by generating an audio message such as a voice prompt.

The means for sending the capability query is preferably adapted to include its own capabilities therein.

Further features of the present invention and its benefits will be explained in the detailed description below.

BRIEF DESCRIPTION OF THE DRAWINGS

The present invention will now be described in more detail by means of preferred embodiments and with reference to the accompanying drawings, in which.

DESCRIPTION OF PREFERRED EMBODIMENTS

Figure 1:
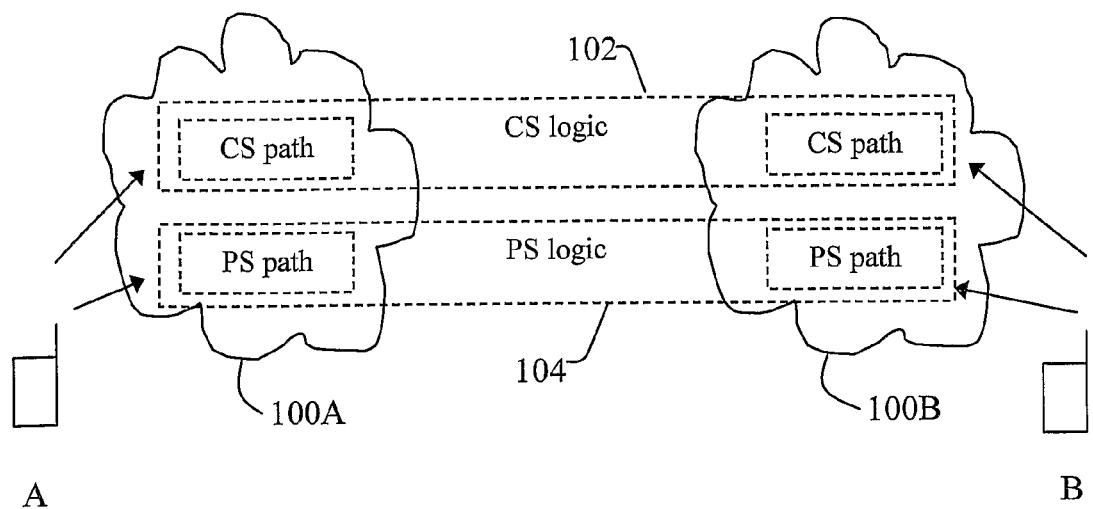
FIG. 1 is a schematic view of a multimedia communication session, according to a previously known solution.
Figure 2:
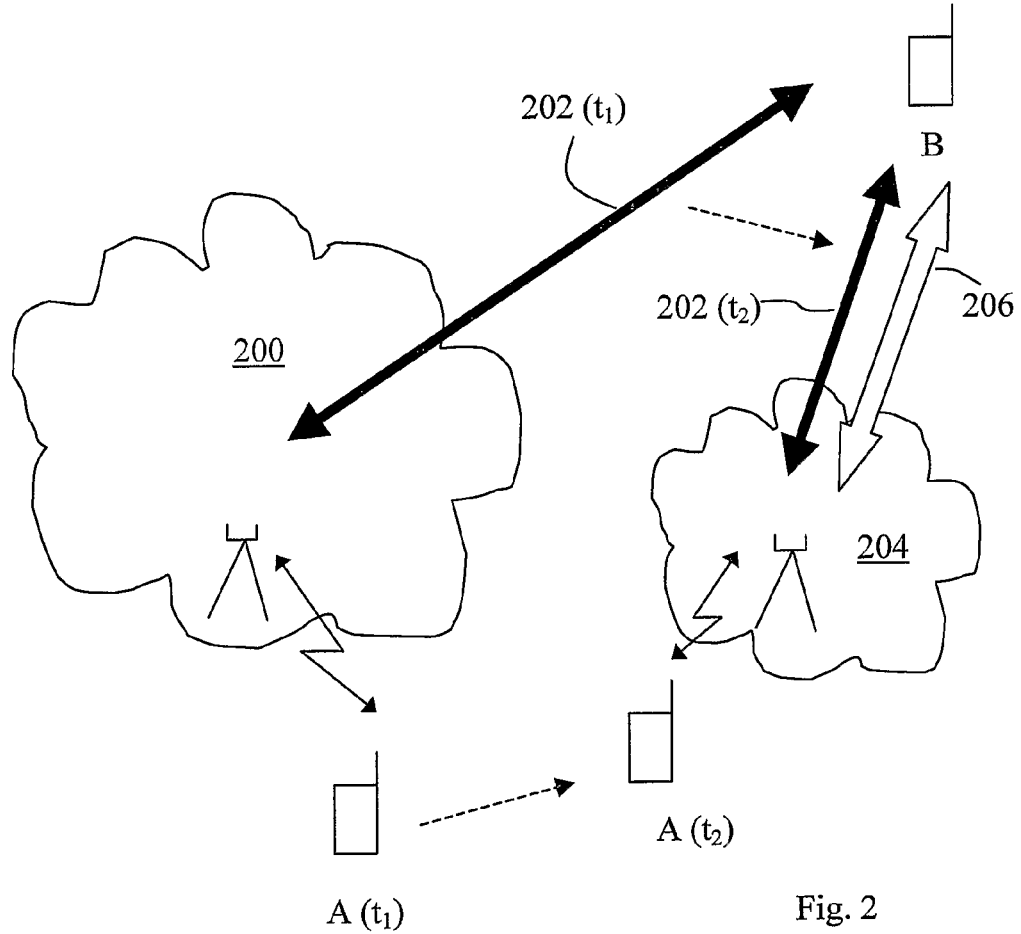
FIG. 2 is a schematic view of an example scenario in which one or more aspects of the present invention can be used, where a mobile terminal A moves from one access network to another.

An example solution will now be described with reference to a communication scenario shown in FIG. 2. A mobile terminal A capable of multimedia communication is initially engaged in a voice call with another terminal B, that could be a mobile terminal, a fixed telephone, a PC, on any other communication unit, likewise capable of multimedia communication. During a first time period $t_1$ of the call, terminal A is thus connected to a base station of a first access network 200 by using a suitable radio channel. During time period $t_1$, a circuit-switched voice connection between the terminals A and B is thus conducted over the first access network 200, as indicated by arrow 202 ($t_1$), according to any suitable protocol for circuit-switched communication, which are not necessary to describe here further to understand the present solution.

The user of terminal A may wish to enrich the voice call by communicating other media with terminal B, e.g. by sending/receiving pictures, documents or audio files, or executing some electronic game on-line, etc. However in this example, the first network 200 is limited in this respect by not admitting packet-switched communication at the same time as the circuit-switched voice call. Hence, terminal A suffers from access constraints imposed by network 200, and a PDP context may not be established for terminal A by network 200. Even if the user of terminal A tries to make a capability query, e.g. by sending the above-described SIP OPTIONS message, this message cannot be handled at all by network 200, having no packet-switching capability, at least not simultaneously with the voice call.

Some time during the voice call, terminal A moves away from the first network 200 and towards a second access network 204 having the capability of handling "dual mode" calls, involving simultaneous packet-switched and circuit-switched communication. Hence in this context, network 204 imposes no access constraints. By way of example, network 200 may use traditional GSM technology admitting CS transfer only, and network 204 may use WCDMA technology or GSM/DTM technology admitting simultaneous CS and PS transfers.

In addition to being capable of multimedia communication, terminal A may also be equipped with dual radio parts and can therefore change its access from network 200 to the new network 204 even if they use different radio technology. In order to do that, well-known intersystem handover procedures may be used, which are not necessary to describe here further to understand the present solution. Furthermore, once terminal A gets connected to network 204, a PDP context may be established for terminal A by the network 204. Thus, terminal A is connected to access network 204 during a second time period $t_2$ of the call, and the circuit-switched voice connection between terminals A and B is thus conducted over the second access network 204 during time period $t_2$, as indicated by arrow 202 ($t_2$).

Since terminal A now does not experience any access constraints in network 204, it has become possible to enrich the ongoing voice call by introducing multimedia. Normally, this change of access is conducted without being noticed by any of the terminal users. Therefore, the user of terminal A, as well as the user of terminal B, will not be aware of this sudden option of using multimedia, unless they are notified in some way.

According to the present example solution, terminal A is adapted to automatically send a capability query, e.g. the SIP OPTIONS message by means of the newly-established PDP context, to terminal B in response to detecting a change of access allowing for multimedia, in this case access to the second access network 204. When terminal B then receives the capability query, it responds by sending its capabilities to terminal A. However, if no PDP context has yet been established for terminal A in the network 204, terminal A must first request a PDP context before sending the capability query. Typically, a PDP context request is forwarded to an IMS network in the home network of terminal A, which then allocates a temporary IP address to the terminal, among other things. The procedure of establishing a PDP context is well-known and is not necessary to describe in more detail to understand the present solution.

Upon receiving capabilities from terminal B, terminal A indicates the new multimedia options to its user in some way, e.g. by displaying corresponding application or other visual indications such as service icons or the like on the screen, or by means of an audio message such as a voice prompt. Generally, the optional multimedia can be indicated in any suitable way, and the present invention is not limited in this respect. In this way, the user of terminal A is automatically notified on the new communication possibilities enabled by the access change to network 204, and can select any type of service and/or application from those indicated, to enrich the call by communicating multimedia over a packet-switched connection, as represented by the additional arrow 206.

After responding to the capability query from terminal A, terminal B may as well automatically send a capability query to terminal A, in order to indicate to its user the newly available multimedia applications/services. Procedures for exchanging capabilities are already known per se. Further, it has been proposed that a terminal shall include its own capabilities when sending a SIP OPTIONS message, in order to save one round-trip in this dialogue.

Figure 3:
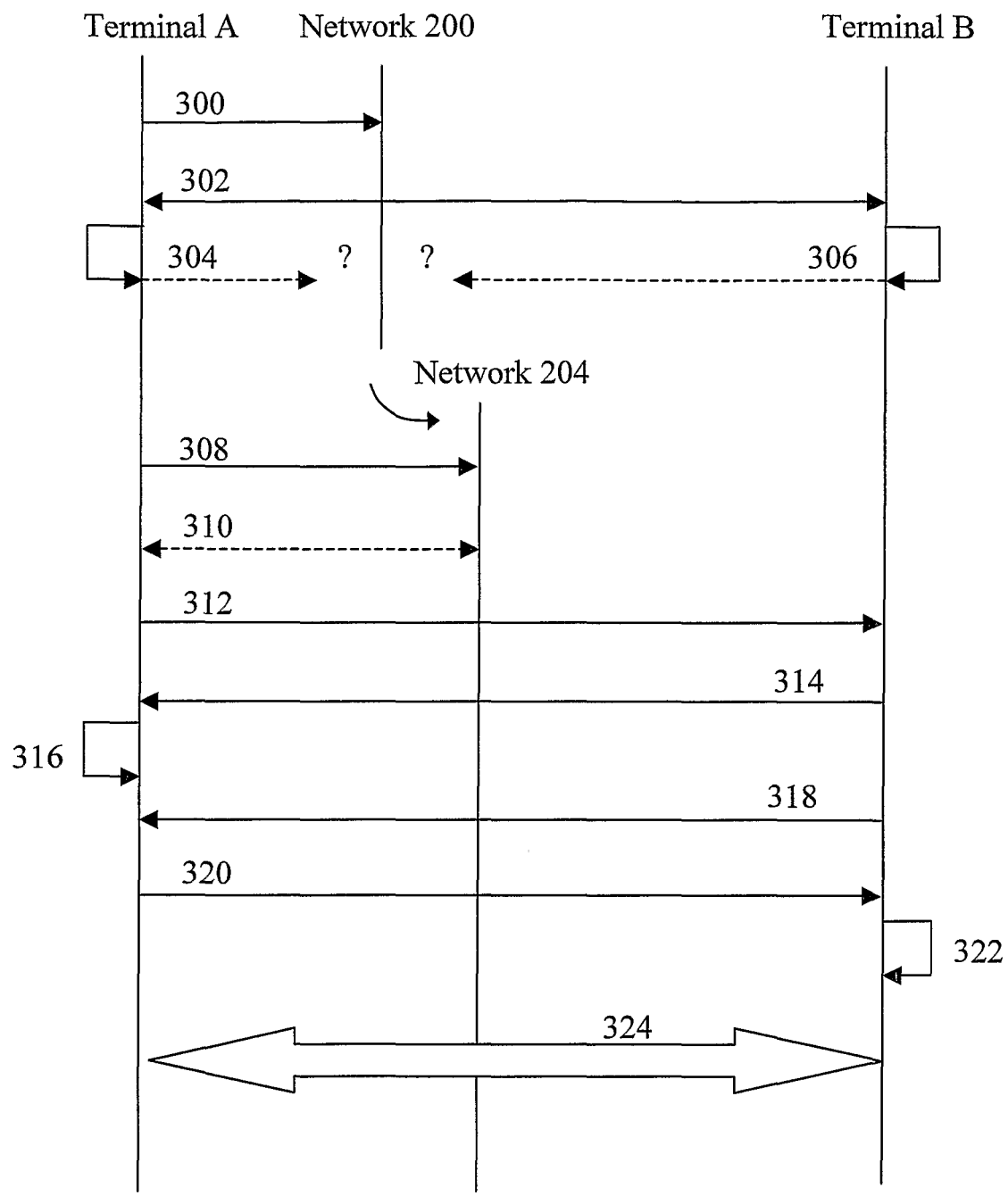
FIG. 3 is a signalling diagram illustrating a first embodiment of a procedure for enabling a multimedia session, in accordance with the present invention.

With reference to a signalling diagram illustrated in FIG. 3, an exemplary signalling procedure will now be described for executing the inventive method according to the scenario of FIG. 2. The diagram thus includes the mobile terminal A, the first access network 200 having access constraints, the second network 204 having no access constraints, and terminal B. The access network used by terminal B is not shown, but it is assumed that terminal B does not experience any such access constraints in this context. It should be noted that terminal B could be any communication unit, mobile or fixed, capable of simultaneous PS and CS communication.

In a first step 300, terminal A gains access with the first network 200, e.g. when powered on. A next step 302 illustrates that a circuit-switched voice call between terminals A and B is established. It does not matter which one of A and B is the calling party and called party, respectively.

In a step 304, terminal A is triggered to send a capability query towards terminal B in response to the call start, e.g. the SIP OPTIONS message, in order to determine any available multimedia options during this call. However, the first network 200 does not understand this message, not being capable of handling PS communication simultaneously. Likewise, terminal A may be triggered to send a capability query towards terminal B in response to the call start, in a step 306, but the first network 200 cannot understand this message either for the same reason. As a result, none of the capability queries 304, 306 can be transferred due to the constraints in network 200. Since neither terminal receives any response to their capability queries, no multimedia options are displayed or otherwise indicated to the respective user, and it is thus not possible to enrich the call with multimedia at the moment.

At some point later during the call, terminal A performs an intersystem handover to the second access network 204, in a next step 308. If no PDP context has been established already for terminal A, this is done in a next step 310 using the new access with network 204.

According to the present example solution, terminal A is triggered to send a capability query towards terminal B in response to the handover, e.g. the SIP OPTIONS message, in a next step 312, over the established PDP context. The second network 204 can handle this message and conveys it to terminal B. Next, terminal B responds by sending its capabilities in a step 314. Upon receiving the capabilities of B, terminal A indicates to its user, in a next step 316, the optional multimedia that can be used within the scope of the capabilities of both terminals A and B, e.g. by displaying corresponding icons or the like on its screen.

Preferably, terminal B also sends a capability query towards terminal A in a next step 318, in response to receiving one from A in step 312. Thereafter, upon receiving the capabilities of A in a step 320, terminal B likewise indicates to its user the optional multimedia, in a next step 322, e.g. by displaying corresponding icons or the like on its screen. Since both terminals A and B now indicates the multimedia services and/or applications to their respective users, their users are free to enrich the still ongoing voice call by introducing multimedia, as indicated in a final step 324.

The above-described procedure of enabling multimedia communication in an ongoing voice call may be modified within the scope of the present invention. For example, the number of steps in the capability exchange can be reduced if terminal A includes its own capabilities in the capability query message 312 such that steps 318 and 320 can be omitted.

Figure 4:
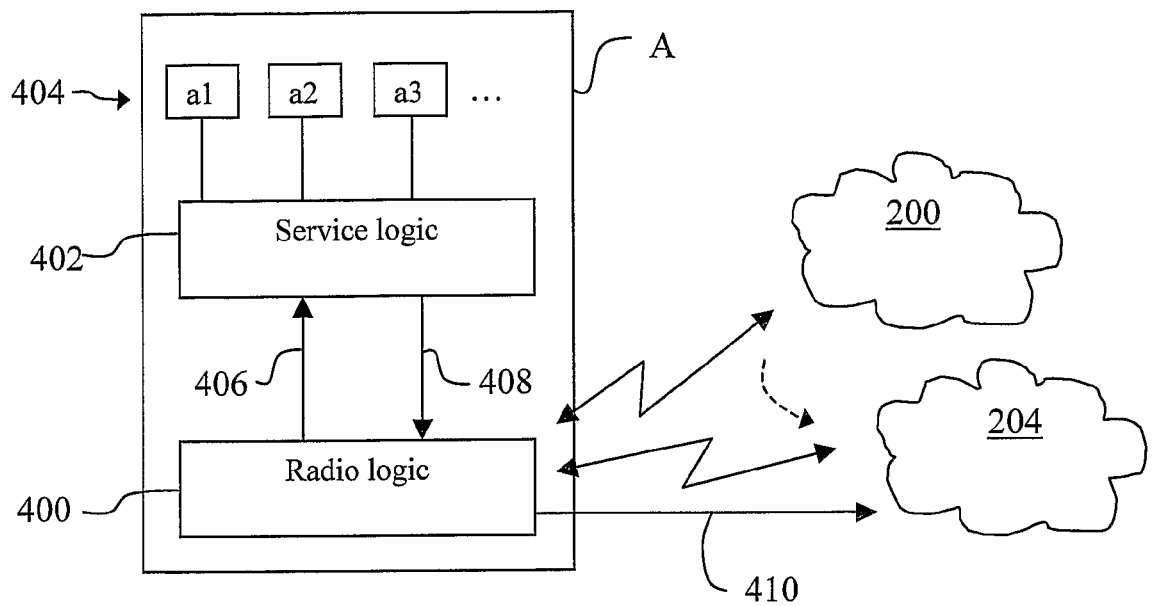
FIG. 4 is a schematic block diagram example of a mobile terminal changing its access from one network to another.

A possible procedure of detecting a change of access by terminal A will now be described in more detail with reference to FIG. 4, schematically illustrating the logic structure of terminal A. In terminal A, specific logics are implemented for handling the radio functions and service functions, as represented by logic units 400 and 402, respectively. In this case, radio logic unit 400 is capable of handling radio access with both networks 200, 203. Each logic unit 400, 402 comprises a protocol stack according to the prevailing standards, not described here further. Of course, there are other logic systems (not shown) implemented as well in the terminal for other functions, which are not necessary to describe here.

Above the service logic unit 402, a series of applications a1, a2, a3 ... are installed in order to enable various services, as controlled by the service logic unit 402. For example, one application a1 may be used for playing a video file in a specific format using a corresponding codec, whereas another application a2 may be used for displaying a picture in a specific format, as received from the other terminal B, using another suitable codec, etc.

When terminal A makes an intersystem handover from network 200 to network 204, the radio logic unit 400 notifies the service logic unit 402 by means of an internal message 406. The service logic unit 402 then orders the radio logic unit 400, by means of an internal message 408, to send a capability query towards terminal B, provided that a PDP context has been established as described above. Then, the capability query 410 is issued accordingly from the radio logic unit 400. After receiving the capabilities of B, the optional multimedia services are determined and the service logic unit 402 indicates these options to the user, e.g. as icons on the screen of terminal A.

Figure 5:
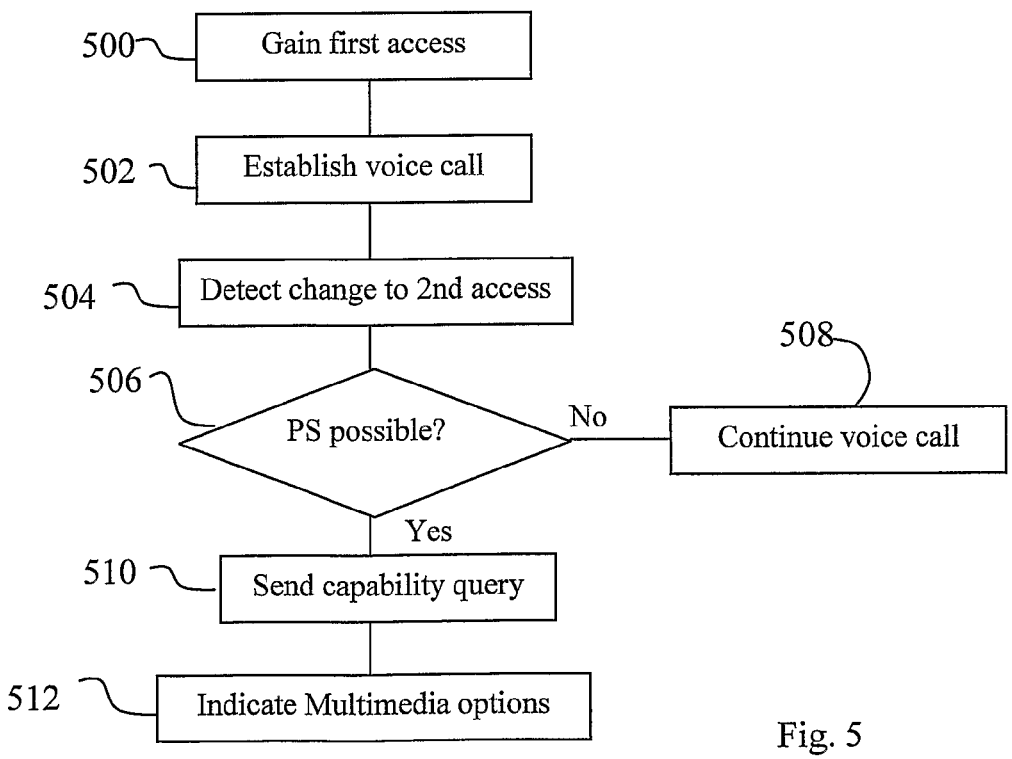
FIG. 5 is a flow chart illustrating a basic procedure for enabling a multimedia session according to an aspect of the invention.

Referring to a flow chart in FIG. 5, a basic procedure of enabling a multimedia communication session in a mobile terminal according to an aspect of the present invention will now be described. This procedure is executed in a mobile terminal, such as terminal A shown in FIGS. 2 and 4. In a first step 500, the mobile terminal gains a first access with a mobile network, the first access having constraints by not admitting simultaneous packet-switched and circuit-switched communications. Using this access, a circuit-switched communication, typically a voice call, is established with another terminal in a next step 502.

At some point later during the call, a change from the first access to a second access is detected in a next step 504, e.g. by making an intersystem handover as described above. Thereafter in step 506, it is determined whether the new access admits packet-switched communication simultaneously with the ongoing voice call. If not, the voice call continues without further action, according to step 508. However, if the second access admits a session comprising both a CS part and a PS part, i.e. making multimedia communication possible, the mobile terminal automatically sends a capability query to the other terminal, as indicated in a step 510. After receiving a response to the capability query from the other terminal, the enabled multimedia services/applications are indicated to the mobile terminal user, in a final step 512. The user is then free to enrich the voice call with multimedia, as described above.

Alternatively, the detected change of access in step 504 may be a new access obtained within the same first network, e.g. by making handover from one constrained cell to another non-constrained one admitting simultaneous PS and CS communication.

The present invention will thus provide the terminal users with the opportunity of using multimedia as soon as it becomes technically possible by means of the new access, and the network operator(s) will also gain revenue therefrom.

While the invention has been described with reference to specific exemplary embodiments, the description is in general only intended to illustrate the inventive concept and should not be taken as limiting the scope of the invention, which is defined by the appended claims.

The invention claimed is:

1. A method of enabling simultaneous packet-switched communication of multimedia, the method, performed by a first mobile terminal, comprising:
    detecting that the first mobile terminal has made a change of connection from a first communication access to a second communication access during an ongoing circuit-switched call between the first mobile terminal and a second terminal, the change of connection occurring when the first mobile terminal changes from the first communication access to the second communication access, the first communication access having constraints by not admitting simultaneous packet-switched and circuit-switched communications and the second communication not having the constraints by admitting simultaneous packet-switched and circuit-switched communications;
    sending a capability query automatically to the second terminal in response to detecting said change of connection;
    receiving capabilities from the second terminal; and
    indicating possible multimedia applications and/or services to a user of the first mobile terminal, according to the capabilities received from the second terminal.

2. The method according to claim 1, wherein the first communication access involves connection with a first access network having said access constraints, and the second communication access involves connection to a second access network lacking said access constraints.

3. The method according to claim 1, wherein the packet-switched communication includes at least one media stream with data for video, text, game and/or images.

4. The method according to claim 1, wherein the circuit-switched call is a voice call.

5. The method according to claim 1, wherein a PDP context is established for the first terminal after said change of connection, but before the step of sending the capability query.

6. The method according to claim 1, wherein the possible multimedia applications and/or services are indicated to the user by displaying corresponding icons on the screen, or by generating an audio message.

7. The method according to claim 1, wherein the step of sending the capability query to the second terminal comprises including capabilities of the first mobile terminal in the capability query sent to the second terminal.

8. A mobile terminal adapted for enabling simultaneous packet-switched communication of multimedia, the mobile terminal comprising:
    a connection change detector adapted to detect that the mobile terminal has made a change of connection from a first communication access to a second communication access during an ongoing circuit-switched call between the mobile terminal and another terminal, the change of connection occurring when the mobile terminal changes from the first communication access to the second communication access, the first communication access having constraints by not admitting simultaneous packet-switched and circuit-switched communications and the second communication not having the constraints by admitting simultaneous packet-switched and circuit-switched communications, the first and second communication accesses both being radio communication accesses;
    a sender adapted to send a capability query automatically to the other terminal over the second access in response to detecting said change of connection;
    a receiver adapted to receive capabilities from the other terminal over the second access; and
    an indicator adapted to indicate possible multimedia applications and/or services to the user of the mobile terminal according to the capabilities received from the other terminal.

9. The mobile terminal according to claim 8, wherein the connection change detector is adapted to detect the change of connection from a first access network having said access constraints to a second access network lacking said access constraints.

10. The mobile terminal according to claim 8, wherein the mobile terminal is adapted to establish a PDP context after said change of connection, but before sending a capability query.

11. The mobile terminal according to claim 8, wherein the indicator is adapted to indicate the possible multimedia applications and/or services by displaying corresponding icons on a screen, or by generating an audio message.

12. The mobile terminal according to claim 8, wherein the sender is adapted to include the mobile terminal's own capabilities in the capability query.

13. A mobile terminal, comprising a radio logic unit and a service logic unit,
    wherein the radio logic unit is arranged to detect that a change of connection has occurred during an ongoing circuit-switched call between the mobile terminal and another terminal, the change of connection occurring when the mobile terminal changes from a first communication access to a second communication access in which the first communication access does not admit simultaneous packet-switched and circuit-switched communications and the second communication access does admit simultaneous packet-switched and circuit-switched communications, the first and second communication accesses both being radio communication accesses, notify the service logic unit of the change of connection from the first communication access to the second communication access, send a capability query to the other terminal over the second communication access upon receipt of an order from the service logic unit, and receive capabilities from the other terminal over the second communication access, wherein the service logic unit is arranged to order the radio logic unit to send the capability query to the other terminal upon being notified of the change of connection by the radio logic unit, and indicate possible multimedia applications and/or services to a user of the mobile terminal according to the received capabilities of the other terminal, and wherein one or both of the radio logic unit and the service logic unit are implemented in hardware at least in part.

14. The mobile terminal according to claim 13, further comprising a screen, wherein the service logic unit is arranged to visibly indicate the possible multimedia applications and/or services to the user on the screen.

15. The mobile terminal according to claim 13, further comprising a speaker, wherein the service logic unit is arranged to audibly indicate the possible multimedia applications and/or services to the user on the speaker.

* * * * *